United States Patent
Angstmann et al.

(10) Patent No.: US 11,639,650 B2
(45) Date of Patent: May 2, 2023

(54) REMOTE UNDERWATER ROBOTIC ACTUATOR

(71) Applicant: Kinetic Pressure Control, Ltd., Houston, TX (US)

(72) Inventors: Steven Angstmann, Houston, TX (US); Bobby Gallagher, Houston, TX (US)

(73) Assignee: Kinetc Pressure Control Ltd., Houston, TX (US)

( * ) Notice: Subject to any disclaimer, the term of this patent is extended or adjusted under 35 U.S.C. 154(b) by 10 days.

(21) Appl. No.: 17/427,638

(22) PCT Filed: Aug. 17, 2020

(86) PCT No.: PCT/US2020/046656
§ 371 (c)(1),
(2) Date: Jul. 31, 2021

(87) PCT Pub. No.: WO2021/034759
PCT Pub. Date: Feb. 25, 2021

(65) Prior Publication Data
US 2022/0049584 A1 Feb. 17, 2022

Related U.S. Application Data

(60) Provisional application No. 62/888,910, filed on Aug. 19, 2019.

(51) Int. Cl.
*E21B 41/04* (2006.01)
*B25J 5/02* (2006.01)
(Continued)

(52) U.S. Cl.
CPC ............... *E21B 41/04* (2013.01); *B25J 5/02* (2013.01); *B25J 9/144* (2013.01); *B25J 13/087* (2013.01)

(58) Field of Classification Search
CPC .... E21B 41/04; B25J 5/02; B25J 9/144; B25J 13/087
See application file for complete search history.

(56) References Cited

U.S. PATENT DOCUMENTS 6,928,947 B1 * 8/2005 Clapham ................. B63C 11/42
114/313
9,234,400 B2  1/2016 Warnock, Jr. et al.
(Continued)

FOREIGN PATENT DOCUMENTS

GB        1337832 A      11/1973
KR   20140013209 A   *   2/2014
(Continued)

OTHER PUBLICATIONS

International Search Report and Written Opinion, International Application No. PCT/US2020/046656 dated Nov. 6, 2020.

*Primary Examiner* — Aaron L Lembo
(74) *Attorney, Agent, or Firm* — Victor H. Segura

(57) ABSTRACT

An underwater robotic system includes a frame adapted to be deployed in a body of water and having guide rails and at least one movable rail movably coupled to the guide rails. An actuator module is movably coupled to the at least one movable rail. A control panel disposed proximate the frame and has a plurality of controls thereon. The plurality of controls is operable by an actuator on the actuator module. A position of each of the plurality of controls is known such that motion of the actuator module and the at least one movable rail is remotely controllable to actuate any chosen one of the plurality of controls.

20 Claims, 5 Drawing Sheets

(51) Int. Cl.
*B25J 9/14* (2006.01)
*B25J 13/08* (2006.01)

(56) References Cited

U.S. PATENT DOCUMENTS

| | | |
|---|---|---|
| 9,494,007 B2 | 11/2016 | Bourgeau et al. |
| 9,822,600 B2 | 11/2017 | Bourgeau et al. |
| 10,316,605 B2 | 6/2019 | Bourgeau et al. |
| 10,465,465 B2 | 11/2019 | Leach et al. |
| 10,941,648 B2 | 3/2021 | Leach et al. |
| 11,060,372 B2 | 7/2021 | Bourgeau et al. |
| 2005/0163573 A1 | 7/2005 | McMillan |
| 2015/0211504 A1* | 7/2015 | Dieringer ................ F04B 35/06 417/415 |
| 2016/0176486 A1 | 6/2016 | Korneliussen et al. |
| 2016/0264223 A1* | 9/2016 | Ferguson ............... B63G 8/001 |
| 2020/0103051 A1* | 4/2020 | Clunie .................. E21B 43/017 |
| 2021/0033388 A1* | 2/2021 | Keltner .............. G01B 11/2518 |

FOREIGN PATENT DOCUMENTS

| | | |
|---|---|---|
| KR | 101369827 B1 * | 3/2014 |
| WO | 198302798 A1 | 8/1983 |
| WO | WO-2022071931 A1 * | 4/2022 |

* cited by examiner

REMOTE UNDERWATER ROBOTIC ACTUATOR

CROSS REFERENCE TO RELATED APPLICATIONS

Continuation of International Application No. PCT/US2020/046656 filed on Aug. 17, 2020. Priority is claimed from U.S. Provisional Application No. 62/888,910 filed on Aug. 19, 2019. Both foregoing applications are incorporated herein by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

This disclosure relates to the field of remotely operated apparatus. More specifically, the disclosure relates to remotely operated robotic devices used to operate certain equipment deployed in a body of water.

Remotely operated vehicles (ROVs) have been used in many fields ranging from underwater to interstellar applications. In the oil and gas industry, ROVs are routinely used to inspect and operate tools and equipment disposed in subsea environments. The ROVs are typically brought to the offshore site on a ship equipped with a crane to deploy the unit and equipment to control the vehicle via a tethered wire system. FIG. 1 depicts a conventional ROV 10 suspended from a ship's 12 crane in a deployment to inspect a blowout preventer (BOP) 14 at the sea floor.

It is known in the art to install emergency activation panels on subsea BOP stacks. These emergency activation panels may comprise valves and stab connectors for hydraulic fluid designed to be operated by ROVs such that the BOP stack can be operated in the event of primary (surface deployed) control failure. ROVs are complex, expensive, have substantial associated equipment and require skilled operators to navigate and control the ROVs while deployed. Conventional ROVs also typically have a high power demand, requiring heavy umbilical conductors to provide the power needed to run propulsion thrusters, lights, manipulating arms, controllers, etc.

There is a need for improved techniques to perform unmanned remote functions, particularly in subsea environments.

SUMMARY

One aspect of the present disclosure is an underwater robotic system including a frame adapted for deployment in a body of water. The frame has guide rails and at least one movable rail movably coupled to the guide rails. An actuator module is movably coupled to the at least one movable rail. A control panel disposed proximate the frame and has a plurality of controls thereon. The plurality of controls is operable by an actuator on the actuator module. A position of each of the plurality of controls is known such that motion of the actuator module and the at least one movable rail is remotely controllable to actuate any chosen one of the plurality of controls.

Some embodiments further comprise a controller in signal communication with a first linear actuator for moving the movable rail and a second linear actuator for moving the actuator module, the controller comprising instructions thereon to operate the first linear actuator and the second linear actuator to position the actuator module proximate the chosen one of the plurality of controls.

Some embodiments further comprise at least one sensor in signal communication with the controller, the controller comprising instructions thereon to operate the first and second linear actuator to automatically move the actuator module to a chosen control in response to measurements made by the at least one sensor.

In some embodiments, the controller comprises instructions to move the actuator module to chosen ones of the plurality of controls in a predetermined sequence.

Some embodiments further comprise a signal communication channel in signal communication with the controller. The signal communication channel in is signal communication with a control system remote from the robotic system.

In some embodiments, the signal communication channel comprises an electrical or optical cable.

In some embodiments, the signal communication channel comprises an acoustic transceiver.

In some embodiments, the actuator is extendable and retractable with respect to the actuator module.

In some embodiments, the actuator is operable to rotate to cause operation of the chosen one of the plurality of controls.

Some embodiments further comprise a battery disposed proximate the frame and in electric power connection with a first linear actuator for moving the movable rail and a second linear actuator for moving the actuator module.

Some embodiments further comprise a battery disposed proximate the frame and configured to power at least one component on the frame.

Some embodiments further comprise an electrical power line extending from the battery to a source of electric power remote from the battery to charge the battery.

Some embodiments further comprise at least one articulated arm coupled to at least one of the frame and the actuator module, the articulated arm comprising jointed sections arranged to enable motion of an end of the articulated arm to a selected position with respect to the frame.

Some embodiments further comprise a manipulation device coupled to the end of the articulated arm.

In some embodiments, the frame is configured to couple to a blowout preventer.

Some embodiments further comprise a hydraulic pump configured to power at least one linear actuator.

A method for remotely operating a control according to another aspect of this disclosure includes deploying a frame in a body of water. The frame has guide rails. The method includes moving a first actuator to a first chosen position within a plane defined by the guide rails. The first chosen position corresponds to a known position of the control on a panel comprising a plurality of controls each at a corresponding known position on the panel. The first actuator is caused to operate the control.

Some embodiments further comprise repeating the moving the first actuator to at least a second chosen position and causing the first actuator to operate one of the plurality of controls associated with the at least a second position. The moving to the first and at least a second position are performed automatically such that operation of the control associated with the first and at least a second position are performed in a predetermined sequence.

In some embodiments, the moving to the first and at least a second position are performed automatically such that operation of the control associated with the first and at least a second position are performed automatically.

In some embodiments, the moving to the first and at least a second position are performed automatically such that operation of the control associated with the first and at least a second position are performed by communicating a control signal from a remote location along a signal communication channel.

In some embodiments, the signal communication channel comprises an electrical or optical cable.

In some embodiments, the signal communication channel comprises an acoustic transceiver.

In some embodiments, the causing the first actuator to operate the control comprises extending the first actuator from an actuator module.

In some embodiments, the causing the first actuator to operate the control comprises rotating the first actuator.

In some embodiments, substantially all power to perform the moving and causing the first actuator to operate is provided by a battery.

In some embodiments, the battery is charged over an electrical power cable linked to a source remote from the battery.

In some embodiments, the chosen position and associated control are automatically chosen in response to measurements made by at least one sensor.

In some embodiments, the frame is coupled to a blowout preventer disposed in the body of water.

Other aspects and possible advantages will be apparent from the description and claims that follow.

DETAILED DESCRIPTION

Figure 1:
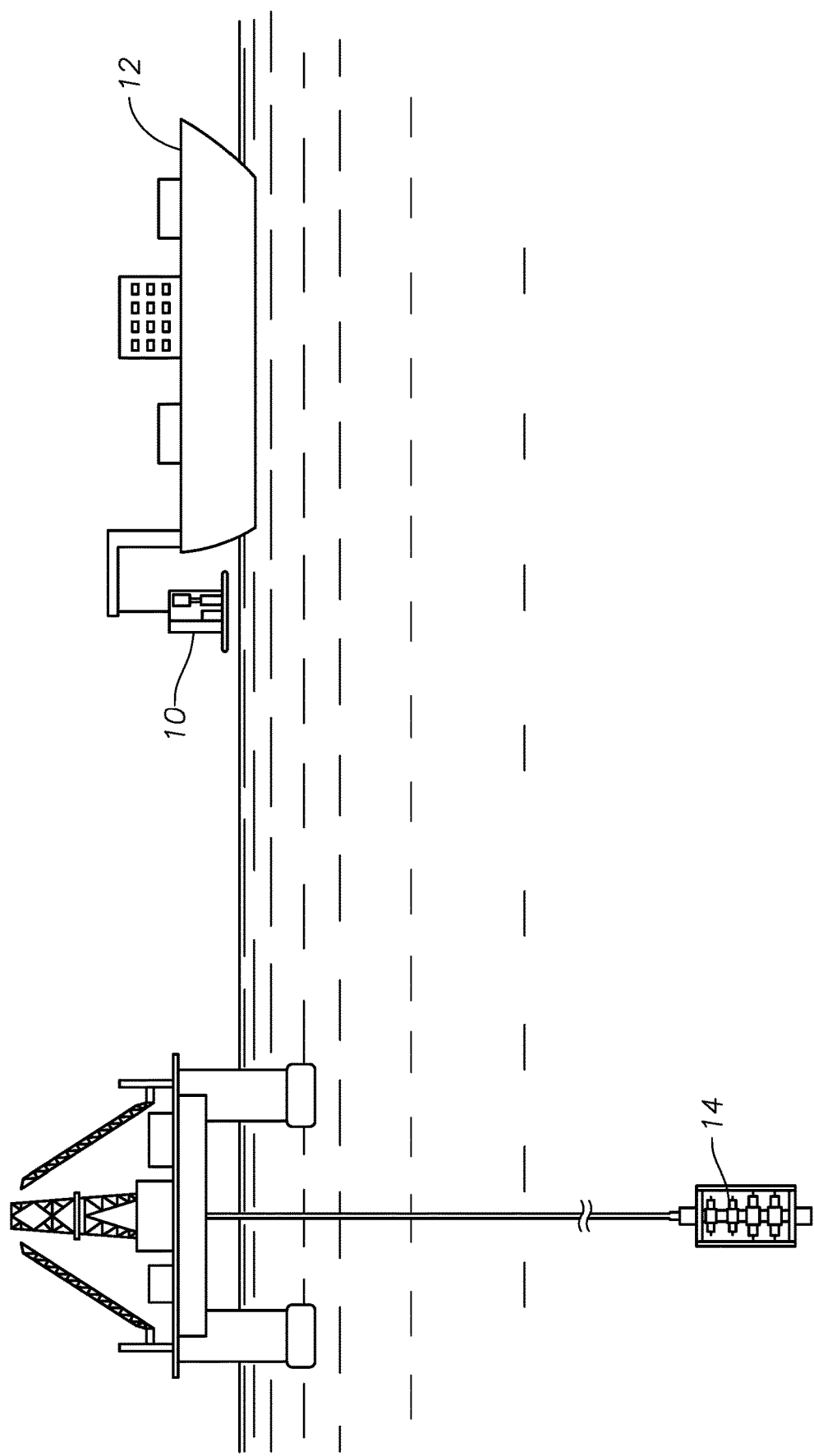
FIG. 1 shows an example deployment of a remotely operated vehicle (ROV) known in the art using a ship's crane to lower the ROV into a body of water.

Illustrative embodiments of a robotic actuator are set forth in this disclosure. In the interest of clarity, not all features of any actual implementation are described. In the development of any such actual implementation, some implementation-specific features may need to be provided to obtain certain design-specific objectives, which may vary from one implementation to another. It will be appreciated that development of such an actual implementation, while possibly complex and time-consuming, would nevertheless be a routine undertaking for persons of ordinary skill in the art having the benefit of this disclosure. The disclosed embodiments are not to be limited to the precise arrangements and configurations shown in the figures and as described herein, in which like reference numerals may identify like elements. Also, the figures are not necessarily drawn to scale, and certain features may be shown exaggerated in scale or in generalized or schematic form, in the interest of clarity and conciseness.

Figure 2:
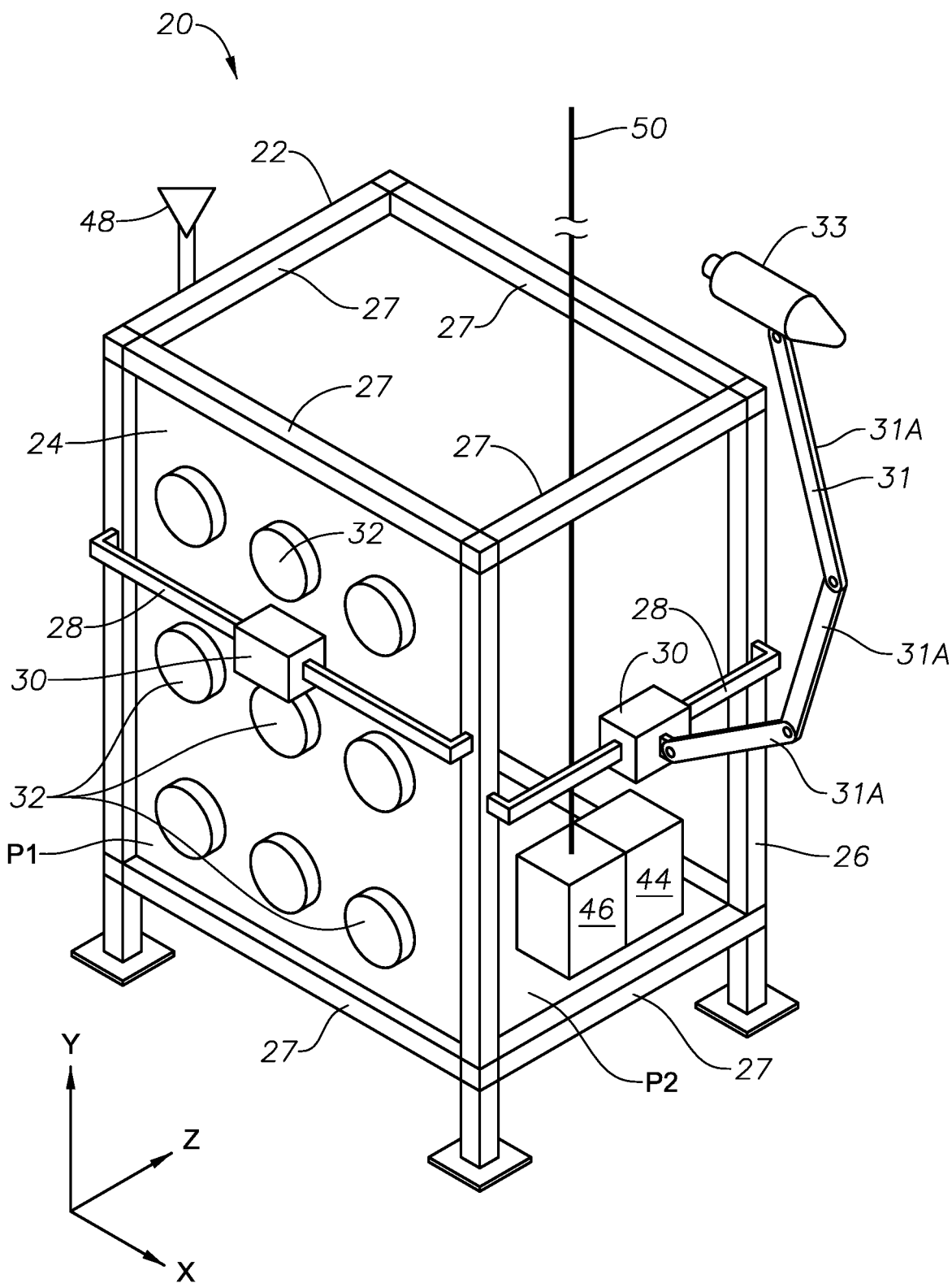
FIG. 2 shows an example embodiment of a robotic system according to the present disclosure.

Embodiments set forth in this disclosure present robotic systems configured for remote deployment and operation, in some embodiments, for deployment in a body of water. Such deployment may be used, for example, to operate equipment disposed in the water, such as on the water bottom. FIG. 2 shows an example embodiment of a robotic system 20. The robotic system 20 comprises a frame structure 22 including an associated control panel 24 and interconnected guide rails 26. The frame structure may be configured to be deployed in a body of water, for example, to operate on the sea bottom to service or operate equipment associated with a subsea petroleum well. The frame structure 22 may be designed in any suitable configuration or geometric arrangement. In some embodiments, at least one surface or face of the frame structure 22 may be configured with guide rails 26 linked together in a planar configuration, i.e., that define a plane, to provide a platform for two-dimensional linear (e.g., vertical and horizontal) movement within the plane defined by the guide rails 26. The guide rails 26 may be linked by cross-braces 27. One such plane P1 is shown in FIG. 2 as extending in the x, y directions, where coordinate directions are indicated by the legend, x, y, z in FIG. 2. Other planes, e.g., P2, may be defined by other such guide rails 26 forming part of the frame structure 22.

The frame structure 22 may include one or more movable rails 28 movably disposed between corresponding guide rails 26 as shown in FIG. 2. The guide rails 26 and movable rails 28 may have any suitable cross-sectional shape, e.g., may be round (i.e., rod-shaped) or square cross-section. The movable rails 28 can move up or down along the guide rails 26 independently of one another. In FIG. 2, one of the movable rails can move within plane P1. Another one of the movable rails 28 may move within another plane P2 defined by guide rails 26 and corresponding cross-braces 27. In some embodiments, such as the one shown in FIG. 2, the frame structure 22 may be implemented with one or more vertically movable rails 28 configured to move vertically along the plane(s) P1, P2 defined by the guide rails 26. Each movable rail 28 may include thereon an actuator module 30 configured to move back and forth along the length of the respective movable rail 28 (e.g., horizontally, from side-to-side in the embodiment of FIG. 2). The robotic system 20 may also comprise an articulated arm 31 coupled at one end to one or more of the actuator modules 30. The articulated arm 31 may be configured with a manipulation device 33 at the other end. The articulated arm 31 may be configured with jointed and/or telescoping sections 31A that allow the articulated arm 31 to move and rotate to various directions and positions. Conventional articulated arms 31 as used in ROVs may be used to implement the embodiments of this disclosure. The manipulation device 33 may be configured to perform any function or combination of functions as known in the art for example and without limitation, a gripper, light, camera, probe, sensor, fastener tool, cutter, torch, etc.

The movable rails 28 may be moved along the respective guide rails 26 by a linear actuator (not shown separately) which may comprise any suitable device known in the art for linear motion, including, without limitation, a linear electric motor, hydraulic cylinder and ram, gear and rack combination, worm gear and ball nut combination and sheave and cable system. A corresponding linear actuator (not shown) may be provided to move each actuator module 30 along its respective movable rail. In combination, the linear actuator for the movable rail 28 and corresponding linear actuator for the actuator module 30 enables each actuator module 30 to be positioned at any chosen location within its respective plane P1, P2.

Figure 3:
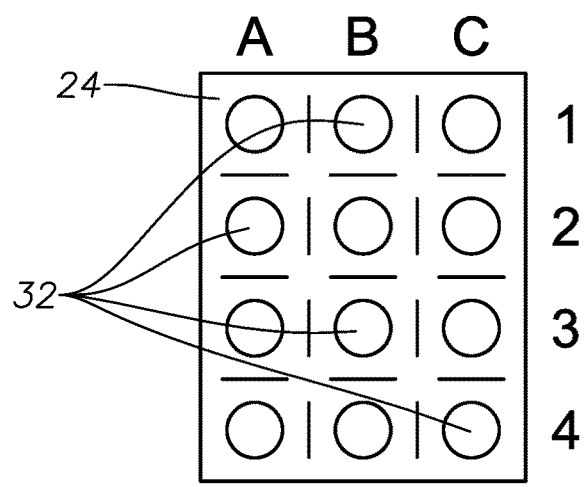
FIG. 3 shows an example embodiment of a control panel arrangement according to the present disclosure.

The control panel 24 may include a plurality of controls, such as knobs or switches 32. The knobs or switches 32 may be arranged on the control panel 24 in an ordered grid pattern. FIG. 3 depicts an example control panel 24 face with the knobs or switches 32 arranged in an ordered grid pattern identified as columns A-C and rows 1-3. Behind the control panel 24, the knobs or switches 32 may be configured with conduits, cables, and wiring of types known in the art used for coupling to the objects to be controlled or activated via the knobs or switches. Some embodiments may be implemented with control panel(s) 24 equipped with switches 32 comprising conventional electric toggle-type switches. Some embodiments may be implemented with switches 32 and actuator modules 30 providing other types of activation/trigger modes as known in the art (e.g., LED, infrared sensors, etc.). The positions of the various knobs or switches 32 in any embodiment of the control panel 24 need not be regularly spaced; in some embodiments, the positions of each of the switches or knobs 32 are known or determinable within the respective plane, e.g., P1 in FIG. 2.

Figure 4:
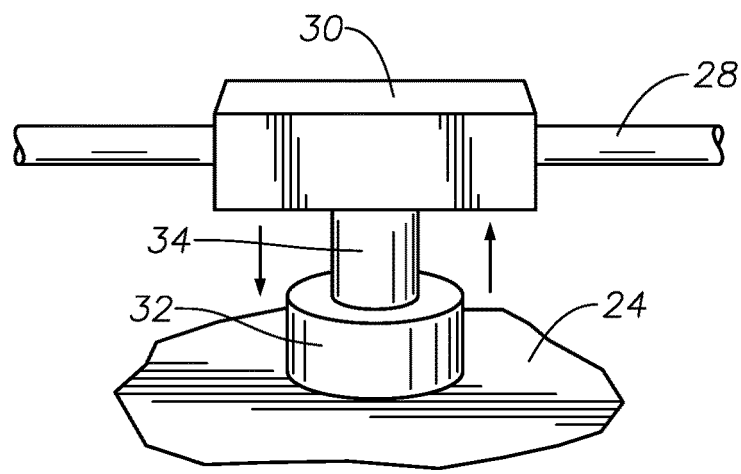
FIG. 4 shows an example embodiment of an actuator module that may be used with the embodiment shown in FIG. 2.

FIG. 4 depicts a side view of an example embodiment of an actuator module 30. The actuator module 30 may be configured with an extendable and retractable pin 34. The control panel 24 is mounted on the frame 22 at a predetermined distance from the actuator module 30 to allow the pin 34 to make contact with the control knobs or switches 32 when the pin 34 is extended from the actuator module 30. With this configuration, if it desired to operate the switch 32 in a chosen control panel grid position (e.g., B-2 in FIG. 3), the movable rail 28 and actuation module 30 respectively move vertically and horizontally to position the pin 34 directly over the switch 32 (in the B-2 position in this example). Once in position, the pin 34 is extended from the actuator module 30 to depress and/or toggle the chosen switch 32. The pin 34 is then retracted into the actuator module 30, ready for another switch or knob operation. The pin 34 may be extended and retracted using any suitable mechanism, including without limitation, a solenoid, hydraulic cylinder, spring (and magnet/coil to retract) and screw drive/nut. In some embodiments, the pin 34 may comprise one or more geometric features (not shown) to engage corresponding feature(s) on the switch or knob 32, for example, splines, to enable operation of the switch or knob 32 by rotating the pin 34 as will be further explained with reference to FIGS. 5A and 5B.

Figure 5A:
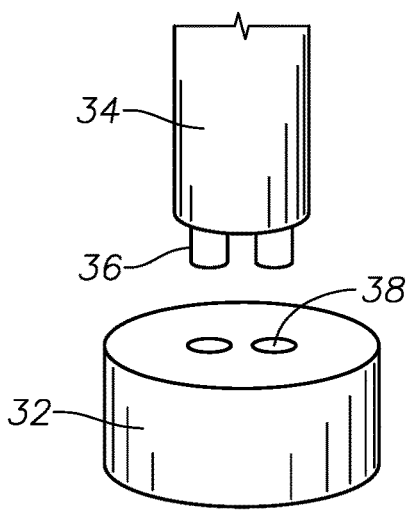
FIGS. 5A and 5B show example embodiments of an actuator used to operate a knob on a control panel such as shown in FIG. 2.
Figure 5B:
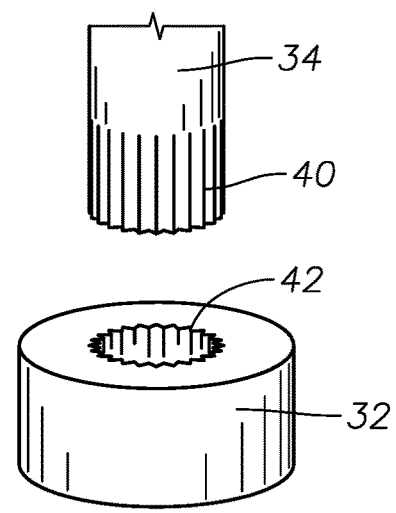

In some implementations, the switches or knobs 32 are configured to rotate to make graduated adjustments (e.g., to make pressure or level adjustments). Some embodiments of the actuator module 30 may therefore be configured with pins 34 that extract, retract, and rotate in either direction in a controlled manner as explained above. Pin 30 embodiments may be configured with the pin end having a specific shape or pattern to engage with the corresponding shape or pattern formed on the knob or switch 32 on the control panel 24. FIG. 5A depicts such an embodiment, with an actuator (e.g., a pin) 34 having a pair of protrusions 36 extending from the pin end to engage with corresponding holes 38 formed on the knob 32 surface. FIG. 5B depicts an actuator (pin) 34 having a splined end 40 to engage with a corresponding splined opening 42 formed in the knob 32 surface. These example configurations enable positive engagement of the pin 34 with and controlled rotation of the knob(s) 32. It will be appreciated that any particular pin-knob embodiments may be configured with other matching patterns, protrusions, or shapes as desired.

The movable rails 28 and actuator modules 30 may be implemented using conventional components and hardware as known in the art. For example, conventional computer numerical control (CNC) framing structures, controllers, electronics, and components may be used to implement some embodiments according to this disclosure. Commercially available components designed for underwater applications may be used to implement the disclosed embodiments. In some implementations, custom designed waterproofing may be required, e.g., for certain water depths, which can be performed using any suitable techniques as known in the art. For example, conventional linear motion bearings can be configured with seals to resist water invasion for underwater applications. Robotic system 20 components may also be formed of non-metallic materials such as plastics, composites, or synthetic materials.

Referring once again to FIG. 2, some embodiments may include a power supply 44, a controller 46, and an acoustic transceiver 48 (e.g., in signal communication with the controller 46). The controller 46 may comprise any suitable microcomputer, field programmable gate array, microprocessor or any similar device and may be programmed to activate and run certain components on the robotic system 20 as desired according to the particular application of the robotic system 20. The power supply 44 may be implemented, for example, using conventional batteries configured for underwater use as known in the art. In some embodiments, a power/communication line 50 may be coupled to the controller 46 or another component on the system to provide a hardwired power and/or data transfer and communication link to the robotic system 20. In some embodiments, the power/communication line 50 may have current carrying capacity only sufficient to recharge the batteries in the power supply 44 while the robotic system 20 is idle, wherein the power supply 44 itself provides sufficient power to operate the robotic system 20 (e.g., the controls, acoustic transceiver, etc.) in its intended use. In such way, providing a high current capacity power line to surface may be avoided. The power/communication line 50 may, for underwater operations, extend to the surface (e.g., to provide direct real time control/data transfer functionality) or to another module on the robotic system 20, or to another tool or device in the vicinity of the system (e.g., another remote robotic system), depending on the desired application. Communication and data signal transfer can also be carried out via the acoustic transceiver 48 as known on the art. In some implementations where direct operator control is desired (e.g., to make selective adjustments or activations using the articulated arm 31) an operator on a ship at the water surface or elsewhere can communicate and direct the robotic system 20 by communicating suitable control signals, along the power/communication line 50 and/or the acoustic transceiver 48. In some embodiments, the controller 46 can be programmed to perform autonomous activations by suitable operation of the actuation module 30 and/or the articulated arm 31.

Figure 6:
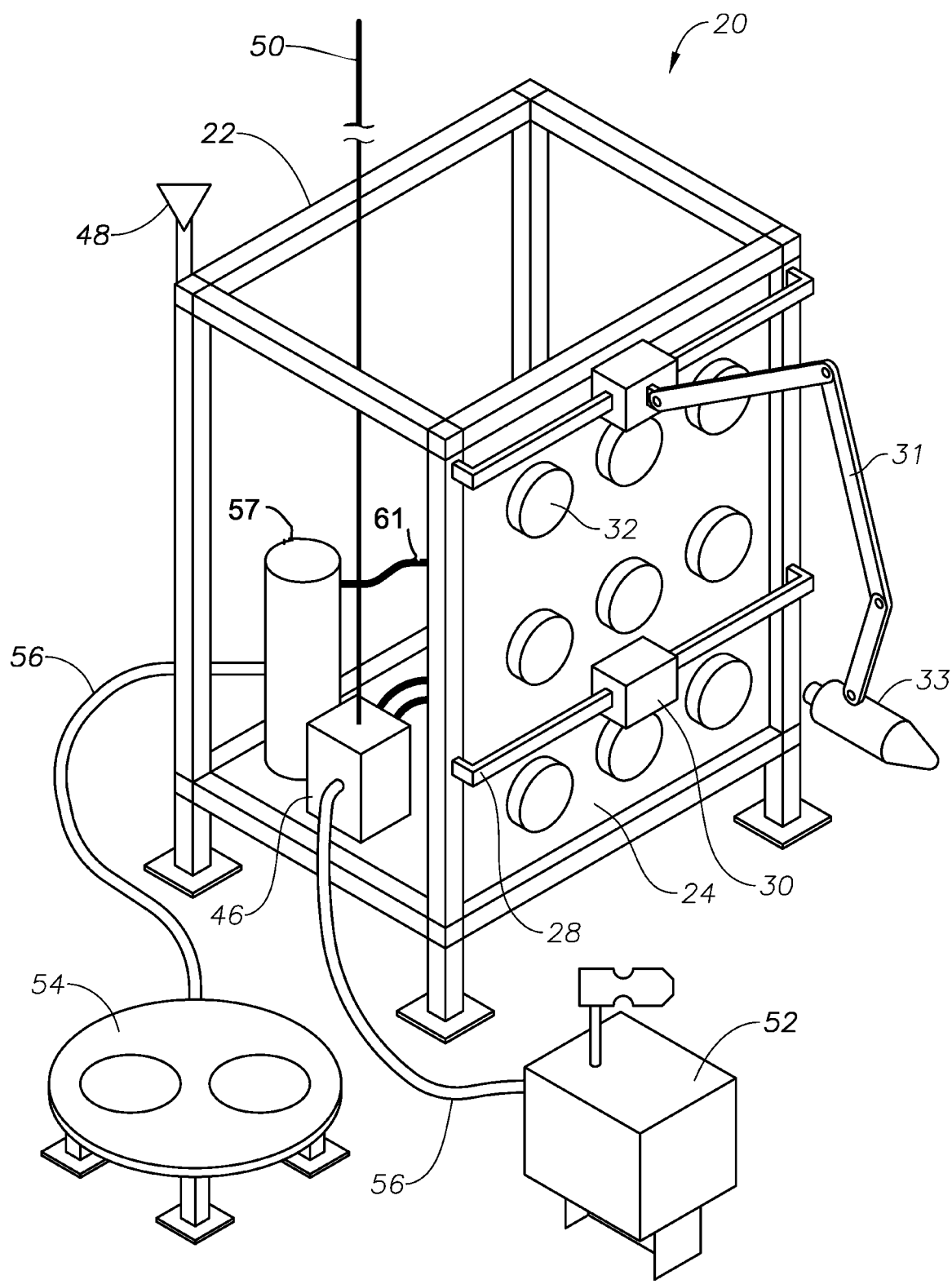
FIG. 6 shows an example embodiment of a robotic system comprising associated apparatus operable by the robotic system.

The robotic system 20 according to this disclosure may be used as stand-alone unit or it may be incorporated or used with other systems, tools, or equipment to be remotely deployed. FIG. 6 depicts a system positioned on the sea floor and linked to sensors 52 and other equipment 54 via conduits (cables or hoses) 56. The control knobs and switches 32 on the control panel 24 in the present example embodiment are linked to the sensors 52 and other equipment 54 to activate and control features and functions on the sensors 52 and equipment 54 as desired. The robotic system 20 may be anchored at the sea floor using techniques as known in the art. In some embodiments, the power supply 44 or the power/communication line 50 may be configured to power a hydraulic pump 57 disposed on the unit, which in turn may be configured to power the linear actuators or other components. Pressurized fluid from the hydraulic pump 57 is conveyed to the controls 32 via a fluid line 61.

Figure 7:
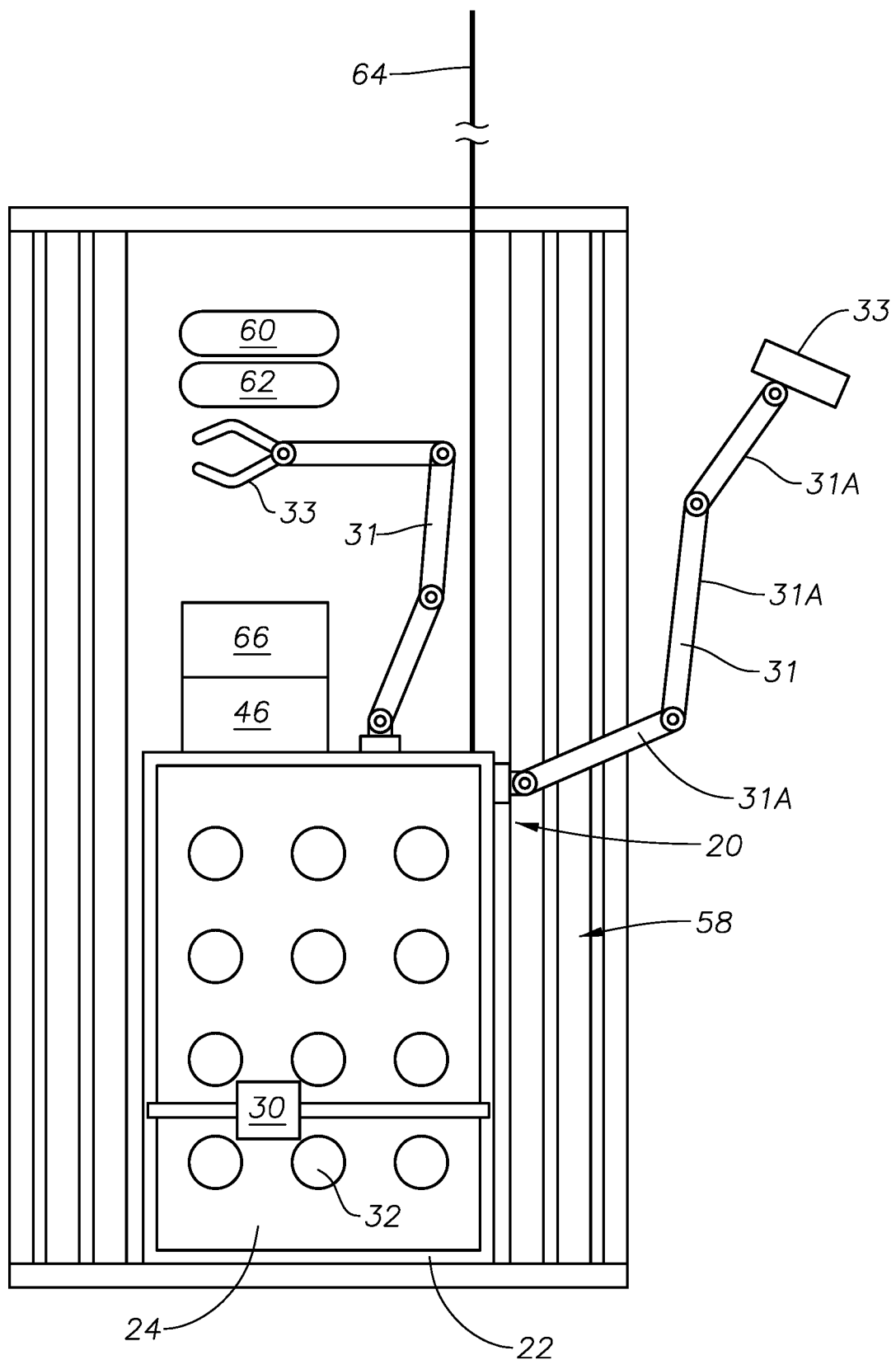
FIG. 7 shows an example embodiment of a robotic system attached to a blowout preventer (BOP).

FIG. 7 depicts a robotic system 20 integrated with a BOP assembly 58 at the sea floor. In some embodiments, the frame structure 22 may be secured to the BOP assembly 58 such that the BOP assembly 58 may be deployed (e.g., attached to a subsea wellhead) with the robotic system 20 coupled in place to the BOP assembly prior to deployment in the water. The robotic system 20 may include components that link with the BOP assembly's 58 hydraulic, pneumatic, and electronic systems to provide system-specific controllability. In addition to the actuator module 30 calibrated to the control panel 24, the robotic system 20 of FIG. 7 may include a pair of articulated arms 31 (as described with reference to FIG. 2) configured to perform multiple operations. The articulated arms 31 may be configured with jointed sections 31A that allow the articulated arms 31 to move and rotate to various directions and positions. The base of each articulated arm 31 is configured to move in linear motion along the rails 22.

With the robotic system 20 incorporated with the BOP 58, the control panel 24 and articulated arms 31 may be used to perform multiple functions remotely. For example, the system 20 may be used to open and close components on the BOP (e.g., valves), vent systems (e.g., accumulators), provide backup/emergency operations, perform arm-disarm functions, perform refill operations (e.g., via a hydraulic fluid reservoir 60 or compressed air tank 62 with an extendable stab). The articulated arms 31 may also be configured with cameras and lights to record unit operation and/or facilitate viewing by a remote operator. In some embodiments, the system 20 can be coupled to the BOP's 58 multiplex (MUX) cable 64 for subsea communication and data transfer to and from the surface. With such embodiments, an operator can directly and remotely control the robotic system's 20 knobs 32, switches 32, and articulated arms 31 as desired. In some embodiments the system 20 can also be linked to receive electrical power from the BOP's power supply 66.

It will be appreciated that embodiments of the disclosed robotic system 20 may be implemented for use in numerous subsea applications and operations, in the oil and gas industry and in other fields of endeavor. In light of the principles and example embodiments described and illustrated herein, it will be appreciated that the example embodiments can be modified in arrangement and detail without departing from the scope of the present disclosure. The foregoing description is made with reference to particular embodiments, but other configurations are also within the scope of this disclosure. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. For purposes of defining the scope of this disclosure, any embodiment referenced herein is freely combinable with any one or more of the other embodiments referenced herein, and any number of features of different embodiments are combinable with one another, unless expressly stated otherwise.

This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. It will also be appreciated by those skilled in the art that embodiments may be implemented using conventional processors and memory in applied computing systems.

Although only a few examples have been described in detail above, those skilled in the art will readily appreciate that many modifications are possible within the disclosed examples. Accordingly, all such modifications are intended to be included within the scope of this disclosure as defined in the following claims.

What is claimed is:

1. An underwater robotic system for controlling a component on a blowout preventer (BOP), comprising:
   a frame configured for mounting on a BOP assembly, wherein the BOP assembly is configured for coupling to a wellhead in a body of water;
   a pump disposed on the frame and configured to couple to a fluid source;
   the frame having guide rails and at least one movable rail movably coupled to the guide rails;
   an actuator module movably coupled to the at least one movable rail; and
   a control panel disposed proximate the frame and having a plurality of controls thereon, the plurality of controls operable by an actuator on the actuator module;
   wherein a position of each of the plurality of controls is known such that motion of the actuator module and the at least one movable rail is controllable to actuate any chosen one of the plurality of controls;
   wherein at least one control of the plurality of controls is configured to link with the BOP assembly to allow fluid flow from the pump to a component of the BOP.

2. The underwater robotic system of claim 1 further comprising a controller in signal communication with a first linear actuator for moving the movable rail and a second linear actuator for moving the actuator module, the controller comprising instructions thereon to operate the first linear actuator and the second linear actuator to position the actuator module proximate the chosen one of the plurality of controls.

3. The underwater robotic system of claim 2 further comprising at least one sensor in signal communication with the controller, the controller comprising instructions thereon to operate the first and second linear actuator to automatically move the actuator module to a chosen control in response to measurements made by the at least one sensor.

4. The underwater robotic system of claim 1 wherein the actuator is extendable and retractable with respect to the actuator module.

5. The underwater robotic system of claim 1 wherein the actuator is operable to rotate to cause operation of the chosen one of the plurality of controls.

6. The underwater robotic system of claim 1 further comprising a battery disposed proximate the frame and in electric power connection with a first linear actuator for moving the movable rail and a second linear actuator for moving the actuator module.

7. The underwater robotic system of claim 1 further comprising at least one articulated arm coupled to at least one of the frame and the actuator module, the articulated arm comprising jointed sections arranged to enable motion of an end of the articulated arm to a selected position with respect to the frame.

8. The underwater robotic system of claim 1 wherein the component of the BOP assembly is a ram on the BOP.

9. A method for operating a component on a blowout preventer (BOP) in an underwater environment, comprising:
   disposing a BOP assembly in a body of water to couple to a wellhead,
   wherein the BOP assembly is equipped with a frame comprising at least a first actuator and a pump coupled to a fluid source;
   moving the at least a first actuator to a first chosen position within a plane defined by guide rails, the chosen position corresponding to a known position of a control on a panel comprising a plurality of controls each at a corresponding known position on the panel; and
   causing the at least a first actuator to operate the control, wherein the control is linked with the BOP assembly to allow fluid flow from the pump to a component of the BOP.

10. The method of claim 9 further comprising repeating the moving the at least a first actuator to at least a second chosen position and causing the at least a first actuator to operate one of the plurality of controls associated with the at least a second position, the moving to the first and at least a second position performed automatically wherein operation of the control associated with the first and at least a second position are performed in a predetermined sequence.

11. The method of claim 10 wherein the moving to the first and at least a second position performed automatically wherein operation of the control associated with the first and at least a second position are performed by communicating a control signal from a remote location along a signal communication channel.

12. The method of claim 9 wherein substantially all power to perform the moving and causing the at least a first actuator to operate is provided by a battery.

13. The method of claim 12 wherein the battery is charged over an electrical power cable linked to a source of electric power remote from the battery.

14. The method of claim 9 wherein the chosen position and associated control are automatically chosen in response to measurements made by at least one sensor.

15. The method of claim 9, wherein the component of the BOP assembly is a ram on the BOP.

16. An underwater robotic system for controlling a component on a blowout preventer (BOP), comprising:
    a frame configured for mounting on a BOP assembly, wherein the BOP assembly is configured for coupling to a wellhead in a body of water;
    a pump disposed on the frame and configured to couple to a fluid source;
    the frame having at least one actuator disposed thereon;
    a control panel disposed proximate the frame and having a plurality of controls thereon, the plurality of controls operable by the at least one actuator; and
    the at least one actuator configured to move to a selected control on the control panel to actuate the control,
    wherein at least one control of the plurality of controls is configured to link with the BOP assembly to allow fluid flow from the pump to a component of the BOP.

17. The underwater robotic system of claim 16 wherein the component of the BOP assembly is a ram on the BOP.

18. The underwater robotic system of claim 16 further comprising a controller configured to operate the at least one actuator to position the actuator proximate a selected control on the control panel.

19. The underwater robotic system of claim 16 further comprising a battery disposed proximate the frame and configured to power at least one component on the frame.

20. The underwater robotic system of claim 16 wherein the pump is configured to power the at least one actuator.

* * * * *